US008361337B2

(12) United States Patent
Park et al.

(10) Patent No.: US 8,361,337 B2
(45) Date of Patent: Jan. 29, 2013

(54) METHOD OF PRODUCING NANOPATTERNED TEMPLATES

(75) Inventors: Soojin Park, Amherst, MA (US);
Thomas P. Russell, Amherst, MA (US);
Jia-Yu Wang, Amherst, MA (US);
Bokyung Kim, Amherst, MA (US)

(73) Assignee: The University of Massachusetts, Boston, MA (US)

( * ) Notice: Subject to any disclaimer, the term of this patent is extended or adjusted under 35 U.S.C. 154(b) by 815 days.

(21) Appl. No.: 12/049,541

(22) Filed: Mar. 17, 2008

(65) Prior Publication Data
US 2008/0230514 A1 Sep. 25, 2008

Related U.S. Application Data

(60) Provisional application No. 60/895,543, filed on Mar. 19, 2007.

(51) Int. Cl.
*B31D 3/00* (2006.01)
(52) U.S. Cl. ............ 216/56; 216/37; 430/311; 430/316; 430/318; 205/80; 205/334; 205/363
(58) Field of Classification Search .................. 216/37, 216/56; 430/311, 316, 318; 205/80, 334, 205/363
See application file for complete search history.

(56) References Cited

U.S. PATENT DOCUMENTS

| | | | |
|---|---|---|---|
| 5,079,268 A * | 1/1992 | Nelissen et al. ................. | 521/81 |
| 5,772,905 A | 6/1998 | Chou | |
| 6,635,904 B2 | 10/2003 | Goetz et al. | |
| 6,746,825 B2 | 6/2004 | Nealey et al. | |
| 6,858,521 B2 * | 2/2005 | Jin ................................ | 438/551 |
| 6,893,705 B2 | 5/2005 | Thomas et al. | |
| 6,926,953 B2 | 8/2005 | Nealey et al. | |
| 6,943,117 B2 | 9/2005 | Jeong et al. | |
| 7,030,167 B2 | 4/2006 | Gunther | |
| 7,081,269 B2 | 7/2006 | Yang et al. | |
| 7,138,325 B2 | 11/2006 | Maleville et al. | |
| 7,189,435 B2 | 3/2007 | Tuominen et al. | |
| 7,190,049 B2 | 3/2007 | Tuominen et al. | |
| 7,632,544 B2 * | 12/2009 | Ho et al. ........................ | 427/271 |
| 2004/0124092 A1 | 7/2004 | Black et al. | |
| 2004/0265548 A1 | 12/2004 | Ho et al. | |
| 2005/0014855 A1 | 1/2005 | Bruza et al. | |
| 2006/0231525 A1 * | 10/2006 | Asakawa et al. ................ | 216/56 |
| 2008/0157314 A1 | 7/2008 | Clevenger et al. | |

(Continued)

FOREIGN PATENT DOCUMENTS

| | | |
|---|---|---|
| GB | 1 294 406 | 10/1972 |
| WO | 2007/038381 | 4/2007 |

OTHER PUBLICATIONS

Fukutani et al. Advanced Materials, vol. 16, No. 16, Aug. 2004 pp. 1456-1460.*

(Continued)

*Primary Examiner* — Lan Vinh
*Assistant Examiner* — Maki Angadi
(74) *Attorney, Agent, or Firm* — Cantor Colburn LLP

(57) ABSTRACT

Nanopatterned substrates can be prepared by a method that includes forming a block copolymer film on a substrate, annealing the block copolymer film, surface reconstructing the annealed block copolymer film, coating an etch-resistant layer on the surface reconstructed block copolymer film, etching the resist-coated block copolymer film to create an etched article comprising a nanopatterned substrate, and separating the etch-resistant layer and the block copolymer film from the nanopatterned substrate. The method is applicable to a wide variety of substrate materials, avoids any requirement for complicated procedures to produce long-range order in the block copolymer film, and avoids any requirement for metal functionalization of the block copolymer.

26 Claims, 5 Drawing Sheets

U.S. PATENT DOCUMENTS

2010/0075116 A1 3/2010 Russell et al.
2010/0086801 A1 4/2010 Russell et al.
2010/0112308 A1 5/2010 Russell et al.

OTHER PUBLICATIONS

Kim et al. Nature, vol. 424, Jul. 24, 2003, pp. 411-414.*
Gaubert et al. Nanotechnology, vol. 18, (2007), pp. 1-7.*
Williams Kirt et al. Journal of Microelectromechanical Systems, vol. 12, No. 6, Dec. 2003, pp. 761-778.*
International Searching Authority, International Search Report, PCT/US2008/057187, Mailing date: Apr. 8, 2008, 7 pages.
International Searching Authority, Written Opinion, PCT/US2008/057187, Mailing date: Apr. 8, 2008, 10 pages.
JP 2001189466, Publication date: Jul. 10, 2001, Abstract, 1 page.
Chan et al., "Ordered Bicontinuous Nanoporous and Nanorelief Ceramic Films from Sels Assembling Polymer Precursors", Science, vol. 286, Nov. 26, 1999, pp. 1716-1719.
Park, et al., "Block Copolymer Lithogaphy", Science, vol. 276, May 30, 1997, pp. 1401-1404.
Zalusky et al., "Mesoporous Polystyrene Monoliths", Journal of the American Chemical Society, vol. 123, No. 7, Jan. 1, 2001, pp. 1519-1520.
Wang et al., "One step fabrication and characterization of platinum nanopore electrode ensembles formed via amphiphilic block copolymer self-assembly", ScienceDirect, Electrochimica Acta, vol. 52, Oct. 25, 2006, pp. 704-709.
Stoykovich et al., Block copolymers and conventional lithography, Materials Today, vol. 9, No. 9, Sep. 2006, pp. 20-29.
Xu et al., The influence of molecular weight on nanoporous polymer films, Polymer, vol. 42, 2001, pp. 9091-9095.
Thurn-Albrecht et al., Science, vol. 290, pp. 2126-2129 (2000).
Fasolka et al., Annual Reviews of Materials Research, vol. 31, pp. 323-355 (2001).
Hawker et al., MRS Bulletin, vol. 30, pp. 952-966 (2005).
Li et al., Advances in Polymer Science, vol. 190, pp. 183-226 (2005).
Thurn-Albrecht et al., Advanced Materials, vol. 12, pp. 787-791 (2000).
Xu et al., Advanced Functional Materials, vol. 13, pp. 698-702 (2003).
Kim et al., Macromolecules, vol. 31, pp. 2569-2577 (1998).
Kimura et al., Langmuir, vol. 19, pp. 9910-9913 (2003).
Ludwigs et al., Nature Materials, vol. 2, pp. 744-747 (2003).
Kim et al., Advanced Materials, vol. 16, pp. 226-231 (2004).
Thurn-Albrecht et al., Macromolecules, vol. 33, pp. 3250-3253 (2000).
Stoykovich et al., Science, vol. 308, pp. 1442-1446 (2005).
Kim et al., Nature, vol. 424, pp. 411-414 (2003).
Segalman et al., Advanced Materials, vol. 13, pp. 1152-1155 (2001).
De Rosa et al., Nature, vol. 405, pp. 433-437 (2000).
Mansky et al., Science, vol. 275, pp. 1458-1460 (1997).
Drockenmuller et al., Journal of Polymer Science, Part A: Polymer Chemistry, vol. 43, pp. 1028-1037 (2005).
Bodycomb et al., Macromolecules, vol. 32, pp. 2075-2077 (1999).
Tang et al., Journal of the American Chemical Society, vol. 127, pp. 6918-6919 (2005).
Villar et al., Polymer, vol. 43, pp. 5139-5145 (2002).
Hartney, et al., Journal of Vacuum Science and Technology B, vol. 3, pp. 1346-1351 (1985).
Cheng et al., Applied Physics Letters, vol. 81, pp. 3657-3659 (2002).
Temple et al., Advanced Materials, vol. 15, pp. 297-300 (2003).
Spatz et al., Advanced Materials, vol. 11, pp. 149-153 (1999).
Spatz et al., Advanced Materials, vol. 10, pp. 849-852 (1998).
Russell et al., Macromolecules 28, 787 (1995).
Mayes et al., MRS Bulletin 22, 43 (1997).
Lin et al., A rapid route to arrays of nanostructures in thin films. Adv. Mater. 14, 1373 (2002).
Fukunaga et al., Large-scale alignment of ABC block copolymer microdomains via solvent vapor treatment. Macromolecules 33, 947 (2000).

Du et al., Additive-driven phase-selective chemistry in block copolymer thin films: the convergence of top-down and bottom-up approaches. Adv. Mater. 16, 953 (2004).
Li et al., Spatially controlled fabrication of nanoporous block copolymers. Chem. Mater. 16, 3800 (2004), Abstract 1 page.
Morkved et al., Local control of microdomain orientation in diblock copolymer thin films with electric fields. Science 273, 931 (1996).
Elhadj et al., Orientation of self-assembled block copolymer cylinders perpendicular to electric field in mesoscale film. Appl. Phys. Lett. 82, 871 (2003).
Mansky et al., Large-area domain alignment in block copolymer thin films using electric fields. Macromolecules 31, 4399 (1998).
Xu et al., Interfacial energy effects on the electric field alignment of symmetric diblock copolymers. Macromolecules 36, 6178 (2003).
Pereira et al., Diblock copolymer thin film melts on striped, heterogeneous surfaces: parallel, perpendicular and mixed lamellar morphologies. Macromolecules 32, 758 (1999).
Wang et al., Simulations of the morphology of cylinder-forming asymmetric diblock copolymer thin films on nanopatterned substrates. Macromolecules 36, 1731 (2003).
Huang et al., Modeling copolymer adsorption on laterally heterogeneous surfaces. Phys. Rev. Lett. 66, 620 (1991).
Rockford et al., Polymers on nanoperiodic, heterogeneous surfaces. Phys. Rev. Lett. 82, 2602 (1999).
Rockford et al., Propagation of nanopatterned substrate templated ordering of block copolymers in thick films. Macromolecules 34, 1487 (2001).
Yang et al., Guided self-assembly of symmetric diblock copolymer films on chemically nanopatterned substrates, Macromolecules 33, 9575 (2000).
Heier et al., Thin diblock copolymer films on chemically heterogeneous surfaces. Macromolecules 30, 6610 (1997).
Park et al., Double textured cylindrical block copolymer domains via directional solidification on a topographically patterned substrate. Appl. Phys. Lett. 79, 848 (2001).
Bal et al., Nanofabrication of integrated magnetoelectronic devices using patterned self-assembled copolymer templates. Appl. Phys. Lett. 81, 3479 (2002).
Spatz et al., A combined top-down/bottom-up approach to the microscopic localization of metallic nanodots. Adv. Mater. 14, 1827 (2002).
Li et al., Dense arrays of ordered GaAs nanostructures by selective area growth on substrates patterned by block copolymer lithography. Appl. Phys. Lett. 76, 1689 (2000).
Harrison et al., Lithography with a mask of block copolymer microstructures. J. Vac. Sci. Technol B 16, 544 (1998).
Black et al., Integration of self-assembled diblock copolymers for semiconductor capacitor fabrication. Appl. Phys. Lett. 79, 409 (2001).
Russell et al., Block copolymers as nanoscopic templates. Macromol. Symp. 159, 77 (2000).
Asakawa et al., Nanopatterning for patterned media using block copolymer. J. Photopolym. Sci. Technol. 15, 465 (2002).
Guarini et al., Nanoscale patterning using self-assembled polymers for semiconductor applications. J. Vac. Sci. Technol. B 19, 2784 (2001).
Cheng et al., Formation of a cobalt magnetic dot array via block copolymer lithography. Adv. Mater. 13, 1174 (2001).
Lammertink et al., Nanostructured thin films of organic-organometallic block copolymers; One-step lithography with poly(ferrocenylsilanes) by reactive ion etching. Adv. Mater. 12, 98 (2000).
Lammertink et al., Poly(ferrocenyldimethylsilanes) for reactive ion etch barrier applications. Chem. Mater. 13, 429 (2001).
Haupt et al., Nanoporous gold films created using templates formed from self-assembled structures of inorganic-block copolymer micelles. Adv. Mater. 15, 829 (2003).
Park et al., Large area orientation of block copolymer microdomains in thin films via directional crystallization of a solvent. Macromolecules 34, 2602 (2001).
Park, et al., A Simple Route to Highly Oriented and Ordered Nanoporous Block Copolymer Templates, ACS Nano, vol. 2, No. 4, Apr. 22, 2008, 766-772.

Park, et al., From Nanorings to Nanodots by Patterning with Block Copolymers, Nano Letters 2008, vol. 8, No. 6, 1667-1672.
U.S. Appl. No. 13/461,175, filed May 1, 2012.
Kim et al., "Phase transition behavior in thin films of block copolymers by use of immiscible solvent vapors", Soft Matter 7, 2001, pp. 443-447.
Park et al., "Large area dense nanoscale patterning of arbitrary surfaces", Applied Physics Letters, vol. 79, No. 2, 2001, pp. 257-259.
U.S. Appl. No. 13/480,506, filed May 25, 2012.
Ansari et al, "Templating the patterning of gold nanoparticles using a stained triblock copolymer film surface", Journal of Chemistry, 2003, p. 2412-2413.
Black et al, "Spin-Dependent Tunneling in Self-Assembled Cobalt-Nanocrystal Superlattices", Science 290, 2000, p. 1131-1134.
Black et al, "Nanometer-Scale Pattern Registration and Alignment by Directed Diblock Copolymer Self-Assembly", IEEE Transactions of NanoTechnology, vol. 3, No. 3, 2004, p. 412-415.
Bockstaller et al, "Block Copolymer Nanocomposites: Perspectives for Tailored Functional Materials", Advanced Materials, 17, 2005, p. 1331-1349.
Cheng et al, "A Highly Regular Two-Dimensional Array of Au Quantum Dots Deposited in a Periodically Nanoporous GaAs Epitaxial Layer", Advanced Materials vol. 14, No. 21, 2002, Abstract.
Chiu et al, "Control of Nanoparticle Location in Block Copolymers", American Chemical Society, 127, 2005, p. 5036-5037.
Chou et al, "Sub-10 nm imprint lithography and applications", J. Vac. Sci. Technol. B, 15(6), 1997, p. 2897-2904.
Fan et al, "Semiconductor Nanowires: From Self-Organization to Patterned Growth", Small, 2, No. 6, 2006, p. 700-717.
Fasolka et al, "Observed Substrate Topography—Mediated Lateral Patterning of Diblock Copolymer Films", The American Physical Society, vol. 79, No. 16, 1997, p. 3018-3021.
Feldheim et al, "Electron Transfer in Self-Assembled Inorganic Polyelectrolyte/Metal Nanoparticle hetrostructures", J. Am. Chem. Soc., 118, 1996, p. 7640-7641.
Gibson, "Reading and Writing with Electron Beams", Physics Today, 1997, p. 56-61.
Glass et al, "Block copolymer micelle nanolithography on non-conductive substrates", New Journal of Physics, 6, 2004, p. 1-17.
Golzhauser et al, "Chemical Nanolithogrpahy with Electorn Beams" Advanced Materials, 13, No. 11, 2001, p. 806-809.
Gorzolink et al, "Nano-structured micropatterns by combination of block copolymer self-assembly and UV photolithography", Nanotechnology, 17, 2006, p. 5027-5032.
Guarini et al, "Process integration of self-assembled polymer templates into silicon nanofabrication", J. Vac. Sci. Technol. B 20(6), 2002, p. 2788-2792.
Hahm et al, "Cylinder Alignment in Annular Structures of Microphase-Separated Polystyrene-b-Poly(methyl methacrylate)" Langmuir, 16, 2000, p. 4766-4769.
Hamley, "Nanotechnology with Soft Materials", Angew. Chem. Int. Ed., 42, 2003, p. 1692-1712.
Haryono et al, "Controlled Arrangement of Nanoparticle Arrays in Block-Copolymer Domains" Small, vol. 2, No. 5, 2006, Abstract.
Heier et al, "Transfer of a chemical substrate pattern into an island-forming diblock copolymer film", Journal of Chemical Physics, vol. 111, No. 24, 1999, p. 11101-11110.
Ho et al, "Solvent-induced microdomain orientation in polystyrene-b-poly(L-lactide) diblock copolymer thin films for nanopatterning", Polymer 46, 2005, p. 9362-9377.
Honda et al, "Impedance Characteristics of the Nanoporous Honeycomb Diamond Electrodes for Electrical Double-Layer Capacitor Applications", Journal of The Electrochemical Society, 148 (7), 2001, p. A668-A679.
Huang et al, "Nanodomain control in copolymer thin films", Nature, vol. 395, 1998, p. 757-758.
Jaramillo et al, "Catalytic Activity of Supported Au Nanoparticles Deposited from Block Copolymer Micelles", J. Am. Chem. Soc., 125, 2003, p. 7148-7148.
Kim et al, "Nanoparticle-Induced Phase Transitions in Diblock-Copolymer Films", Advanced Materials, vol. 17, No. 21, 2005. Abstract.
Kim et al, "Salt Complexation in Block Copolymer Thin Films", Macromolecules, 39, 2006, p. 8473-8479.
Kubo et al, "Characterization of pattern transfer in the fabrication of magnetic nanostructure arrays by block copolymer lithography", Applied Physics Letters, 90, 2007, p. 233113-1-233113-3.
Li et al, "Ordered Block-Copolymer Assembly Using Nanoimprint Lithography", Nano Letters, 4 (9), 2004, p. 1633-1636.
Li et al, "Block copolymer patterns and templates", Materials Today, vol. 9, No. 9, 2006, p. 30-39.
Lin et al, "Self-directed self-assembly of nanoparticle/copolymer mixtures", Nature, 434, 2005, p. 55-59.
Lopes et al, "Hierarchial self-assembly of metal nanostructures on diblock copolymer scaffolds", Nature, vol. 414, 2001, p. 735-738.
Maier et al, "Plasmonic—A Route to Nanoscale Optical Devices", Advanced Materials, Dec. 2001, p. 1501-1505.
Meli et al, "Self-Assembled Masks for the Transfer of Nanometer-Scale Patterns into Surfaces: Characterization by AFM and LFM", American Chemical Society, 2002, p. 131-135.
Morikawa et al, "Optical Alignment and Patterning of Nanoscale Microdomains in a Block Copolymer Thin Film", Advanced Materials, 18, 2006, p. 883-886.
Park et al, "Fabrication of Highly Ordered Silicon Oxide Dots and Stripes from Block Copolymer Thin Films", Advanced Materials, 2008, vol. 20, p. 681, Abstract 2 pages.
Park et al, "Macroscopic 10-Terabit per Square-Inch Arrays from Block Copolymers with Lateral Order", Science, 323, 2009, p. 1030-1033.
Park et al, "Solvent-Induced Transition from Micelles in Solution to Cylindrical Microdomains in Diblock Copolymer Thin Films", Macromolecules, 40, 2007, p. 9059-9063.
Pelletier et al, "Aluminum nanowire polarizing grids: Fabrication and analysis", Applied Physics Letters, 88, 2006, p. 211114-1-211114-3.
Ross, "Patterned Magnetic Recording Media", Annu. Rev. Mater. Res. 2001, p. 203-235.
Segalman, "Patterning with block copolymer thin films", Materials Science and Engineering R 48, 2005, p. 191-226.
Sohn et al, "Sluggish Development of Parallel Lamellae at the Strongly interacting Interface in Thin Films of Symmetric Diblock Copolymers", Langmuir 18, 2002, p. 10505-10508.
Sohn et al, "Directed Self-Assembly of Tow Kinds of Nanoparticles Utilizing Monolayer Films of Diblock Copolymer Micelles", J. Am. Chem. Soc. 125, 2003, p. 6368-6369.
Song et al, "Faceting Kinetics of Stepped Si(113) Surfaces: A Time-Resolved X-Ray Scattering Study", Physical Review Letters, vol. 74, No. 26, 1995, p. 5240-5243.
Song et al, "Attractive step-step interactions, tricriticality, and faceting in the orientation phase diagram of silicon surfaces between [113] and [114]", Physical Review B, vol. 51, No. 15, 1995, p. 10068-10085.
Thompson et al, "Predicting the Mesophases of Copolymer-Nanoparticle Composites", Science 292, 2001, p. 2469-2472.
Wyrwa et al, "One-Dimensional Arrangements of Metal Nanoclusters", American Chemical Society, 2002, p. 419-421.
U.S. Appl. No. 13/546,378, filed Jul. 6, 2012.
Park et al., "Enabling nanotechnology with self assembled block copolymer patterns", Polymer, 44, 2003, pp. 6725-6760.

* cited by examiner a b

METHOD OF PRODUCING NANOPATTERNED TEMPLATES

CROSS REFERENCE TO RELATED APPLICATION

This application claims the benefit of U.S. Provisional Patent Application Ser. No. 60/895,543 filed Mar. 19, 2007, which is fully incorporated herein by reference.

STATEMENT REGARDING FEDERALLY SPONSORED RESEARCH & DEVELOPMENT

The U.S. Government has certain rights in this invention pursuant to National Science Foundation MRSEC on Polymers Grant No. DMR-0213695.

BACKGROUND OF THE INVENTION

The ability of soft materials, like block copolymers, to self-assemble into arrays of nanometer-sized domains makes them attractive candidates for the generation of high-density media for use in data storage, electronics, and molecular separation. See, e.g., T. Thurn-Albrecht et al., *Science*, volume 290, pages 2126-2129 (2000); H. J. Fan et al., *Small*, volume 2, pages 700-717 (2006); and M. J. Fasolka and A. M. Mayes, *Annual Reviews of Materials Research*, volume 31, pages 323-355 (2001). Block copolymers have gained increasing attention as templates and scaffolds for the fabrication of high-density arrays of nanoscopic elements due to the size and tunability of the microdomains, the ease of processing without introducing disruptive technologies, and the ability to manipulate their functionality. See, e.g., C. J. Hawker and T. P. Russell, *MRS Bulletin*, volume 30, pages 952-966 (2005); M. Li et al., *Advances in Polymer Science*, volume 190, pages 183-226 (2005); M. Park et al., *Science*, volume 276, pages 1401-1404 (1997); T. Thurn-Albrecht et al., *Advanced Materials*, volume 12, pages 787-791 (2000); and T. Xu et al., *Advanced Functional Materials*, volume 13, pages 698-702 (2003). For block copolymers having cylindrical microdomains with high aspect ratios, it is necessary to control the orientation and lateral ordering of the microdomains to optimize the contrast in transfer applications and the lateral density of elements. It is also highly desirable that the process be independent of the underlying substrate. Approaches to manipulate the orientation and lateral ordering of the microdomains in thin films of block copolymers include the use of solvent fields (see, e.g., G. Kim et al., *Macromolecules*, volume 31, pages 2569-2577 (1998); M. Kimura et al., *Langmuir*, volume 19, pages 9910-9913 (2003); S. Ludwigs et al., *Nature Materials*, volume 2, pages 744-747 (2003); and S. H. Kim et al., *Advanced Materials*, volume 16, pages 226-231 (2004)), electric fields (see, e.g., T. Thurn-Albrecht et al., *Macromolecules*, volume 33, pages 3250-3253 (2000)), chemically patterned substrates (see, e.g., M. P. Stoykovich et al., *Science*, volume 308, pages 1442-1446 (2005); S. O. Kim. et al., *Nature*, volume 424, pages 411-414 (2003)), graphoepitaxy (see, e.g., R. A. Segalman et al., *Advanced Materials*, volume 13, pages 1152-1155 (2001)), epitaxial crystallization (see, e.g., C. De Rosa et al., *Nature*, volume 405, pages 433-437 (2000)), controlled interfacial interactions (see, e.g., P. Mansky et al., *Science*, volume 275, pages 1458-1460 (1997); E. Drockenmuller et al., *Journal of Polymer Science, Part A: Polymer Chemistry*, volume 43, pages 1028-1037 (2005)), thermal gradients (see, e.g., J. Bodycomb et al., *Macromolecules*, volume 32, pages 2075-2077 (1999)), zone casting (see, e.g., C. Tang et al., *Journal of the American Chemical Society*, volume 127, pages 6918-6919 (2005)), and shear (see, e.g., M. A. Villar et al., *Polymer*, volume 43, pages 5139-5145 (2002)).

By removal of the minor (by volume) phase, a nanoporous template is produced where the aspect ratio of the pores is dictated by the thickness of the film. While the aspect ratio of the pores provides a natural etching contrast, the incorporation of an inorganic element, like Si or Fe into one of the blocks has also been used to enhance contrast. See, e.g., M. A. Hartney et al., *Journal of Vacuum Science and Technology B*, volume 3, pages 1346-1351 (1985); J. Y. Cheng et al., *Applied Physics Letters*, volume 81, pages 3657-3659 (2002); and K. Temple et al., *Advanced Materials*, volume 15, pages 297-300 (2003). As another example, Park et al. used an $OsO_4$-stained microphase-separated thin film of poly(styrene-block-butadiene), which, with a reactive ion etch (RIE) contrast of 2:1, produced an array of holes in an underlying silicon nitride substrate. See M. Park et al., *Science*, volume 276, pages 1401-1404 (1997). And Spatz et al. quaternized poly(styrene-b-2-vinylpyridine) (PS-b-P2VP) with auric acid, depositing gold in the P2VP microdomains, to generate masks for nanolithography. See J. P. Spatz et al., *Advanced Materials*, volume 11, pages 149-153 (1999). Spatz et al. have also "grown" Ti on top of a polystyrene matrix to enhance contrast. See J. P. Spatz et al., *Advanced Materials*, volume 10, pages 849-852 (1998).

Notwithstanding the variety of existing methods for using block copolymers to create nanoporous substrates, there remains a need for simplified methods that are applicable to a wide variety of substrates, avoid any requirement for complicated procedures to produce long-range order in the block copolymer film, and avoid any requirement for metal functionalization of the block copolymer.

BRIEF DESCRIPTION OF THE INVENTION

The above-described and other drawbacks are alleviated by a method of preparing a nanopatterned substrate, comprising: forming a block copolymer film on a substrate; annealing the block copolymer film in an annealing solvent vapor; surface reconstructing the annealed block copolymer film; coating an etch-resistant layer on the surface reconstructed block copolymer film to form a resist-coated block copolymer film; etching the resist-coated block copolymer film to create an etched article comprising a nanopatterned substrate; and separating the etch-resistant layer and the block copolymer film from the nanopatterned substrate.

Another embodiment is a method of preparing a nanoporous substrate, comprising: spin coating a block copolymer film on a substrate; wherein the block copolymer film comprises a polystyrene-poly(4-vinylpyridine) diblock copolymer comprising a polystyrene block having a number average molecular weight of about 20,000 to about 60,000 atomic mass units and a poly(4-vinylpyridine) block having a number average molecular weight of about 5,000 to about 30,000 atomic mass units; wherein the polystyrene-poly(4-vinylpyridine) diblock copolymer has a polydispersity index of about 1.05 to about 1.2; and wherein the block copolymer film has a thickness of about 15 to about 30 nanometers; annealing the block copolymer film in an annealing solvent vapor comprising toluene and tetrahydrofuran; wherein the annealed block copolymer film comprises a hexagonal array of cylindrical poly(vinyl-substituted nitrogen heterocycle) microdomains; surface reconstructing the annealed block copolymer film by immersing it in ethanol, thereby forming a surface reconstructed block copolymer film comprising a hexagonal array of cylindrical pores; coating a gold layer on the surface reconstructed block copolymer film; wherein the gold layer has a thickness of about 0.5 to about 2 nanometers; etching the gold-coated block copolymer film to create an etched structure comprising a substrate comprising a hexagonal array of pores; wherein etching comprises reactive ion etching using a gas comprising tetrafluoromethane; and treating the etched structure with a solution comprising iodine and potassium iodide to separate the gold layer and the block copolymer film from the substrate, thereby yielding a nanoporous substrate.

These and other embodiments are described in detail below.

DETAILED DESCRIPTION OF THE INVENTION

Figure 1:
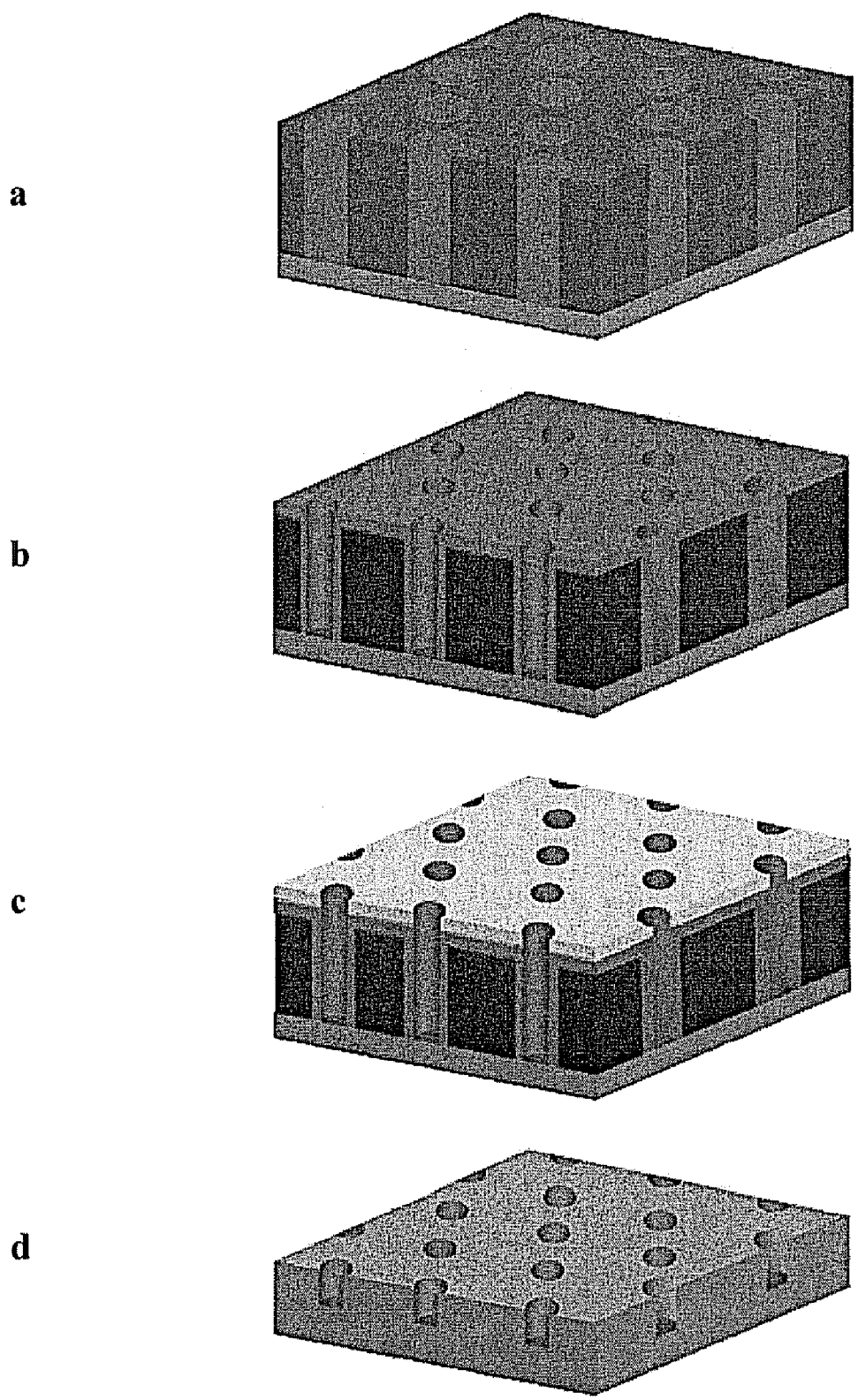
FIG. 1 is a diagrammatic representation of the products obtained after various steps of one embodiment of the method of fabricating a nanoporous template; specifically, it depicts the products obtained on (a) coating a block copolymer film on a substrate and annealing the film to obtain a highly ordered film comprising cylindrical microdomains of the second block perpendicular to the plane of the film; (b) surface reconstructing the film to produce a film including cylindrical nanopores and a surface layer of the second block; (c) depositing a layer of gold on the surface reconstructed film; and (d) reactive ion etching the gold-coated film, and separating the gold-coated block copolymer layer from the nanoporous substrate.

The present inventors have discovered that highly ordered nanoporous and other nanopatterned substrates may be prepared by a block copolymer templating method that avoids any requirement for complicated procedures to produce long-range order in the block copolymer film and avoids any requirement for metal functionalization of the block copolymer. The method is applicable to a wide variety of substrate materials.

Thus, one embodiment is a method of preparing a nanopatterned substrate, comprising: forming a block copolymer film on a substrate; annealing the block copolymer film in an annealing solvent vapor; surface reconstructing the annealed block copolymer film (in a solvent for the minor phase); coating an etch-resistant layer on the surface reconstructed block copolymer film to form a resist-coated block copolymer film; etching the resist-coated block copolymer film to create an etched article comprising a nanopatterned substrate; and separating the etch-resistant layer and the block copolymer film from the nanopatterned substrate.

The method comprises forming a block copolymer film on a substrate. In general, the substrate may comprise any material that is wettable by the block copolymer and resistant to the solvents used for spin coating and solvent annealing of the block copolymer film. For embodiments in which reactive ion etching is used to etch the resist-coated block copolymer film, the substrate should comprise a material capable of being etched by reactive ion etching. Suitable materials include, for example, silicon dioxide, silicon nitride, passivated silicon, polystyrenes, polyimides, poly(butylenes terephthalate)s, and germanium. In some embodiments, the substrate surface in contact with the block copolymer film is chemically homogeneous.

A wide variety of block copolymers can be used in the method. In particular, combinations of polymer blocks varying widely in their solubility (cohesion) properties can be used to form the phase-separated films used herein. Many combinations of different blocks have sufficiently different solubility properties that they form thermodynamically favored phase-separated films. Even combinations of blocks with similar solubility properties can form kinetically trapped phase-separated films when the coating solvent favors dissolution of one block over another.

The block copolymer comprises at least one first block and at least one second block different from the first block. The block copolymer may, optionally, further comprise a third type of block, a fourth type of block, etc. The block copolymer may be a diblock copolymer, a triblock copolymer, a tetrablock copolymer, or a higher order block copolymer. In some embodiments, the block copolymer is a diblock copolymer. Polymer blocks suitable for use in the block copolymer include, for example, polyolefins (including partially fluorinated and perfluorinated polyolefins), poly(alkenyl aromatic)s (including polystyrenes), poly(conjugated dienes)s (including polybutadiene and polyisoprene), hydrogenated poly(conjugated dienes)s, (including hydrogenated polybutadiene (poly(ethylene-butylene)) and hydrogenated polyisoprene (poly(ethylene-propylene))), poly(vinyl-substituted nitrogen heterocycle)s, poly(alkyl(meth)acrylate)s (including poly(methyl methacrylate) and poly(butyl acrylate)), poly((meth)acrylic acid)s, poly(alkylene oxide)s (including poly(ethylene oxide) and poly(propylene oxide)), poly(arylene oxide)s (including poly(2,6-dimethyl-1,4-phenylene ether)), poly(arylene sulfide)s (including poly(phenylene sulfide), poly(vinyl alkanoates) (including poly(vinyl acetate)), poly(vinyl ether)s (including poly(vinyl methyl ether)), poly(vinyl halide)s (including poly(vinyl chloride)), poly(vinyl alcohol)s, polyurethanes, poly(meth)acrylonitriles, polyesters (including poly(ethylene terephthalate) and poly(butylene terephthalate) and polycaprolactone), polyamides (including nylon-6 and nylon-6,6), polyimides (including poly(4,4'-oxydiphenylene-pyromellitimide) and polyimides with modified branches), polycarbonates (including polycarbonates based on bisphenol A), polysulfones (including those prepared by polymerization of bisphenol A and bis(4-chlorophenyl)sulfone, polysiloxanes (including poly(dimethylsiloxane)), and the like.

In some embodiments, the block copolymer comprises a poly(alkenyl aromatic) block that is the polymerization product of an alkenyl aromatic monomer having the structure

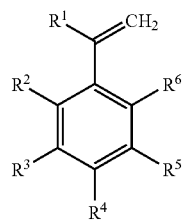

wherein $R^1$ is hydrogen or $C_1$-$C_6$ alkyl, and each occurrence of $R^2$, $R^3$, $R^4$, $R^5$, and $R^6$ is independently selected from the group consisting of hydrogen, $C_1$-$C_6$ alkyl (including methyl, t-butyl, and the like), and halogen (including fluorine, chlorine, bromine, and iodine). Specific alkenyl aromatic monomers include styrene, ($C_1$-$C_{12}$-alkyl)styrenes (including alpha-methylstyrene, 2-methylstyrene, 3-methylstyrene, 4-methylstyrene, 4-t-butylstyrene, and the like), and halogenated styrenes (including 4-chlorostyrene). In some embodiments, the block copolymer comprises a polystyrene block.

In some embodiments, the block copolymer comprises a poly(vinyl-substituted nitrogen heterocycle) block. A vinyl-substituted nitrogen heterocycle is a cyclic compound having at least one nitrogen atom in the ring and a vinyl group attached directly to the ring. Vinyl-substituted nitrogen heterocycles that can be polymerized to form the poly(vinyl-substituted nitrogen heterocycle) block include, for example, the polymerization products of 2-vinylpyridine, 3-vinylpyridine, 4-vinylpyridine, 2-methyl-5-vinylpyridine 1-vinylimidazole, 2-vinylimidazole, 4-vinylimidazole, N-vinyl-2-methylimidazole, N-vinyl-2-ethylimidazole, 2-vinylpyrrole, 3-vinylpyrrole, and mixtures thereof. In some embodiments, the block copolymer comprises a poly(4-vinylpyridine) block.

In some embodiments, the block copolymer consists of at least one poly(alkenyl aromatic) block and at least one poly (vinyl-substituted nitrogen heterocycle) block. In some embodiments, the block copolymer consists of one poly(alkenyl aromatic) block and one poly(vinyl-substituted nitrogen heterocycle) block. In some embodiments, the block copolymer is a polystyrene-poly(4-vinylpyridine) diblock copolymer.

The molecular weights of the block copolymer blocks can vary widely, depending on the intended microdomain structure of the block copolymer film. For example, The number average molecular weight of each block can be about 2,000 to about 1,000,000 atomic mass units, specifically about 5,000 to about 500,000 atomic mass units, more specifically about 10,000 to about 200,00 atomic mass units. The volume ratio of the first block to the second block can be about 1:10 to about 10:1, specifically about 3:2 to about 10:1. At some volume ratios for some block copolymers, the minor phase forms microdomains consisting of cylinders oriented perpendicular to the plane of the film. On surface reconstruction, such perpendicular cylinders are converted to perpendicular cylindrical pores. At some volume ratios for some block copolymers, the minor phase forms microdomains consisting of lines parallel to the plane of the film. On surface reconstruction, such parallel lines are converted to troughs (trenches).

A variety of methods are suitable for forming the block copolymer film. Such film-forming methods include, for example, solvent casting, spin coating, drop casting, doctor blading, dip coating, ink jetting, roll coating, extrusion coating, spraying, polymerization casting, melt processing, and combinations thereof.

In some embodiments, the block copolymer film is coated from a solution of the block copolymer. The solution comprises the block copolymer and a solvent for the block copolymer. Suitable solvents will, of course, depend on the chemical composition of the block copolymer. Suitable solvents can be selected by those skilled in the art without undue experimentation. For example, when the block copolymer is a polystyrene-poly(4-vinylpyridine) diblock copolymer, suitable solvents include aromatic hydrocarbon solvents (such as benzene, toluene, ethylbenzene, chlorobenzene, and the like), cyclic ether solvents (such as dioxane, tetrahydrofuran, and the like), ketones (such as acetone, methyl ethyl ketone, and the like), chlorinated aliphatic hydrocarbon solvents (such as chloroform, trichloroethylene, and the like), alkyl alkanoate solvents (such as ethyl acetate, butyl acetate, and the like), and mixtures thereof. In some embodiments, coating the block copolymer film comprises spin coating the block copolymer film from a solution comprising a polystyrene-poly(4-vinylpyridine) diblock copolymer, toluene, and tetrahydrofuran. The solution may comprise the toluene and tetrahydrofuran in a weight ratio of about 1:1 to about 4:1. The block copolymer film is typically coated at a temperature below the glass transition temperature of at least one block. Many block copolymers can be solvent coated at room temperature.

The block copolymer film will vary in thickness according to factors including the total molecular weight of the block copolymer and the film-forming conditions. In some embodiments, the block copolymer film has a thickness of about 10 to about 100 nanometers, specifically about 15 to about 80 nanometers, more specifically about 20 to about 50 nanometers. In some embodiments, the block copolymer film has a thickness corresponding to about one period of the block copolymer. The relationship between film thickness and the period of the block copolymer can be determined using methods known in the art. See, e.g., T. P. Russell, P. Lambooy, J. G. Barker, P. D. Gallagher, S. K. Satija, G. J. Kellogg, and A. M. Mayes, *Macromolecules* 28, 787 (1995); A. M. Mayes, S. K. Kumar, *MRS Bulletin* 22, 43 (1997).

The method comprises annealing the block copolymer film in an annealing solvent vapor. The selection of annealing solvent will, of course depend on the chemical composition of the block copolymer. For example, when the block copolymer is a polystyrene-poly(4-vinylpyridine) diblock copolymer suitable annealing solvents include aromatic hydrocarbon solvents (such as benzene, toluene, ethylbenzene, chlorobenzene, and the like), cyclic ether solvents (such as dioxane, tetrahydrofuran, and the like), ketones (such as acetone, methyl ethyl ketone, and the like), chlorinated aliphatic hydrocarbon solvents (such as chloroform, trichloroethylene, and the like), alkyl alkanoate solvents (such as ethyl acetate, butyl acetate, and the like), and mixtures thereof. As a particular example, when the block copolymer is a polystyrene-poly(4-vinylpyridine) diblock copolymer, the annealing solvent vapor may comprise a mixture of toluene and tetrahydrofuran. Solvent annealing may be conducted at a temperature of about 10 to about 60° C., for a time of about 10 minutes to a few days. For example, a block copolymer film of polystyrene-block-poly(4-vinylpyridine) can be annealed in a solvent vapor of toluene/tetrahydrofuran in about six hours at room temperature.

In some embodiments, the annealed block copolymer film comprises a hexagonal array of cylindrical microdomains (the main axis of each microdomain being perpendicular to the plane of the film). These hexagonal arrays can exhibit high long-range order. For example, the hexagonal array of cylindrical microdomains may be characterized by an orientation order of at least 0.85, specifically at least 0.9. In some embodiments, the orientation order is about 0.85 to about 0.95, more specifically about 0.9 to about 0.95. Orientation order may be determined by image analysis of scanning force microscopy images of the block copolymer films using, for example, MATLAB software from The Mathworks. The cylindrical microdomains may be separated by a nearest-neighbor distance of about 10 to about 100 nanometers, specifically about 20 to about 70 nanometers, more specifically about 25 to about 50 nanometers.

In some embodiments, the annealed block copolymer film comprises a linear array of microdomains (in the plane of the film).

While the present inventors have observed that the combination of coating and annealing is sufficient to generate a highly regular nanopatterned structure in the block copolymer film, the method may, optionally, further comprise using one or more additional methods of orienting the microdomains of the block copolymer film. Such additional methods include, for example, solvent fields (see, e.g., G. Kim et al., *Macromolecules*, volume 31, pages 2569-2577 (1998); M. Kimura et al., *Langmuir*, volume 19, pages 9910-9913 (2003); S. Ludwigs et al., *Nature Materials*, volume 2, pages 744-747 (2003); and S. H. Kim et al., *Advanced Materials*, volume 16, pages 226-231 (2004)), electric fields (see, e.g., T. Thurn-Albrecht et al., *Macromolecules*, volume 33, pages 3250-3253 (2000)), chemically patterned substrates (see, e.g., M. P. Stoykovich et al., *Science*, volume 308, pages 1442-1446 (2005); S. O. Kim. et al., *Nature*, volume 424, pages 411-414 (2003)), graphoepitaxy (see, e.g., R. A. Segalman et al., *Advanced Materials*, volume 13, pages 1152-1155 (2001)), epitaxial crystallization (see, e.g., C. De Rosa et al., *Nature*, volume 405, pages 433-437 (2000)), controlled interfacial interactions (see, e.g., P. Mansky et al., *Science*, volume 275, pages 1458-1460 (1997); E. Drockenmuller et al., *Journal of Polymer Science, Part A: Polymer Chemistry*, volume 43, pages 1028-1037 (2005)), thermal gradients (see, e.g., J. Bodycomb et al., *Macromolecules*, volume 32, pages 2075-2077 (1999)), zone casting (see, e.g., C. Tang et al., *Journal of the American Chemical Society*, volume 127, pages 6918-6919 (2005)), and shear (see, e.g., M. A. Villar et al., *Polymer*, volume 43, pages 5139-5145 (2002)).

The method comprises surface reconstructing the annealed block copolymer film. The surface reconstruction method is described in T. Xu et al., *Advanced Functional Materials*, volume 13, pages 698-702 (2003) and typically consists of exposing the annealed block copolymer film to a solvent that preferentially dissolves the minor phase of the block copolymer film and effects transfer of that phase to the surface of the film. It is important to note that no chemical bonds are broken in the surface reconstruction process, and that the process is reversible (for example, by the application of heat). Surface reconstruction is conducted at a temperature below the glass transition temperature of the major (matrix) phase of the block copolymer film, so that the structure of the film being conserved in that the spaces formerly occupied by the minor phase are converted to voids. For example, when the minor phase consists of cylinders perpendicular to the plane of the film, surface reconstruction results in migration of the minor phase to the top surface of the film and formation of cylindrical voids where the minor phase formerly resided. As another example, when the minor phase consists of lines parallel to the plane of the film, surface reconstruction results in the migration of the minor phase to the top surface of the film and formation of linear voids (troughs or trenches) where the minor phase formerly resided.

As mentioned above, the surface reconstruction method used herein comprises exposing the annealed block copolymer film to a solvent that selectively swells or dissolves the minor phase. The selection of a suitable solvent for surface reconstruction will therefore depend on the chemical compositions of the major and minor phases, those skilled in the art can select a suitable solvent for surface reconstruction. For example, when the block copolymer is a polystyrene-poly(4-vinylpyridine) diblock copolymer, surface reconstructing the annealed block copolymer film may comprise immersing the block copolymer film in a lower alkanol solvent such as methanol, ethanol, or a mixture thereof.

In addition to forming a block copolymer film on a substrate, annealing the block copolymer film, and surface reconstructing the annealed block copolymer film, the method comprises coating an etch-resistant layer on the surface reconstructed block copolymer film to form a resist-coated block copolymer film. The etch-resistant layer may be coated using various methods known in the art, include, for example, evaporating, sputtering, chemical vapor deposition (CVD), and metalorganic chemical vapor deposition (MOCVD). The etch-resistant layer will generally include at least one material that is more etch-resistant than the block copolymer film. Suitable materials include metals, such as iron, ruthenium, osmium, cobalt, nickel, palladium platinum, copper, silver, gold, and the like, and alloys of the foregoing. When the etch-resistant layer comprises a metal, the etch-resistant layer may be formed by evaporating the metal and allowing the evaporated metal to deposit on the top surface of the block copolymer film. In order to avoid depositing metal into the voids formed on surface reconstruction, the metal is typically deposited from a glancing angle relative to the plane of the block copolymer film.

In some embodiments, the etch-resistant layer comprises a material that interacts strongly with the polymer block that migrates to the surface of the block copolymer film during the surface reconstruction step. For example, when the block copolymer is a polystyrene-poly(4-vinylpyridine) diblock copolymer, the poly(4-vinylpyridine) can migrate to the surface of the block copolymer film during the reconstruction step, and the etch resistant layer can be gold or another metal that interacts strongly with poly(4-vinylpyridine).

The etch-resistant layer should be thick enough to provide at least one monolayer of the etch-resistant material, yet not so thick as to mask the pores in the surface reconstructed block copolymer film. For example, when gold is used as the etch-resistant material, the thickness can be about 0.5 to about 10 nanometers, specifically about 0.5 to about 5 nanometers.

The method further comprises etching the resist-coated block copolymer film. Suitable etching methods include for example, dry chemical etching, wet chemical etching, plasma etching, reactive ion etching, micromachining, electron beam writing, laser micromachining, ablation, ion beam milling, and the like. In some embodiments, reactive ion etching is used. Suitable precursors for reactive ion etching include, for example, tetrafluoromethane, fluorotrichloromethane, and antimony hexafluoride. In some embodiments, etching the resist-coated block copolymer film comprises reactive ion etching using a tetrafluoromethane precursor.

The method further comprises separating the etch-resistant layer and the block copolymer film from the nanopatterned substrate. In some embodiments, this separation step comprises contacting the etched article with a solution capable of dissolving or solubilizing the etch-resistant layer. For example, when the etch-resistant layer comprises gold, suitable solutions include aqueous solutions comprising potassium iodide and iodine, and aqueous solutions comprising cyanide ion. In some embodiments, the separation step comprises using a so-called lift-off method to swell the block copolymer layer and separate it and the overlying etch-resistant layer from the substrate. Solvents suitable for use in a lift-off method include any solvent or solvent mixture capable of swelling the block copolymer. For example, when the block copolymer is a polystyrene-poly(4-vinylpyridine) diblock copolymer, suitable solvents include toluene, tetrahydrofuran, chloroform, dimethylformamide, dimethylacetamide, and the like, and mixtures thereof. The lift-off method may, optionally, comprise agitation or sonication to facilitate separation of the swollen block copolymer layer from the substrate. In some embodiments, separating the etch-resistant layer and the block copolymer film from the nanopatterned substrate comprises contacting the etched article with an aqueous solution comprising potassium iodide and iodine.

The method has been observed to accurately replicate the lateral (in-plane) dimensions of the surface-reconstructed film in the substrate. However, depending on the etch-resistant layer composition and the etching conditions, the depth of voids formed in the substrate can vary substantially from those in the solvent-reconstructed film. For example, when the nanopatterned substrate is a nanoporous substrate comprising cylindrical pores, the substrate pores will have a diameter close to that of the surface-reconstructed film, but the substrate pore depth can vary such that the ratio of pore depth to pore diameter is about 1:1 to about 100:1, specifically about 2:1 to about 50:1, more specifically about 5:1 to about 30:1.

One embodiment is a method of preparing a nanoporous substrate, comprising: spin coating a block copolymer film on a substrate; wherein the block copolymer film comprises a polystyrene-poly(4-vinylpyridine) diblock copolymer comprising a polystyrene block having a number average molecular weight of about 20,000 to about 60,000 atomic mass units and a poly(4-vinylpyridine) block having a number average molecular weight of about 5,000 to about 30,000 atomic mass units; wherein the polystyrene-poly(4-vinylpyridine) diblock copolymer has a polydispersity index of about 1.05 to about 1.2; and wherein the block copolymer film has a thickness of about 15 to about 30 nanometers; annealing the block copolymer film in an annealing solvent vapor comprising toluene and tetrahydrofuran; wherein the annealed block copolymer film comprises a hexagonal array of cylindrical poly(vinyl-substituted nitrogen heterocycle) microdomains; surface reconstructing the annealed block copolymer film by immersing it in ethanol, thereby forming a surface reconstructed block copolymer film comprising a hexagonal array of cylindrical pores; coating a gold layer on the surface reconstructed block copolymer film; wherein the gold layer has a thickness of about 0.5 to about 2 nanometers; etching the gold-coated block copolymer film to create an etched structure comprising a substrate comprising a hexagonal array of pores; wherein etching comprises reactive ion etching using a gas comprising tetrafluoromethane; and treating the etched structure with a solution comprising iodine and potassium iodide to separate the gold layer and the block copolymer film from the substrate, thereby yielding a nanoporous substrate.

The nanopatterned substrates generated by the method are useful for the fabrication of high-density data storage media, microelectronic components, and molecular separation devices.

The invention is further illustrated by the following non-limiting examples.

EXAMPLES

Figure 2:
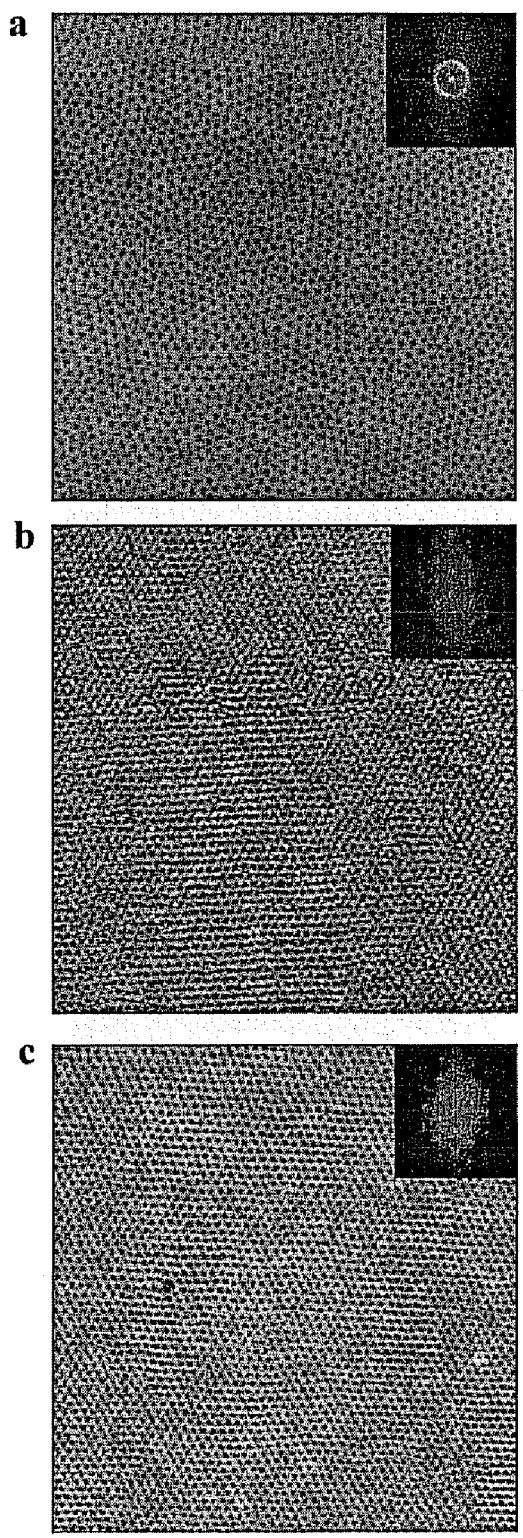
FIG. 2 consists of scanning force microscopy (SFM) images of 2 micrometer×2 micrometer areas of highly ordered PS-b-P4VP films on silicon substrates: (a) as-spun films; (b) films after solvent annealing (note well-developed hexagonal structure); (c) films after surface reconstruction. Insets in each image are Fourier transforms; those for (b) and (c) show the characteristic of the long-range order.
Figure 3:
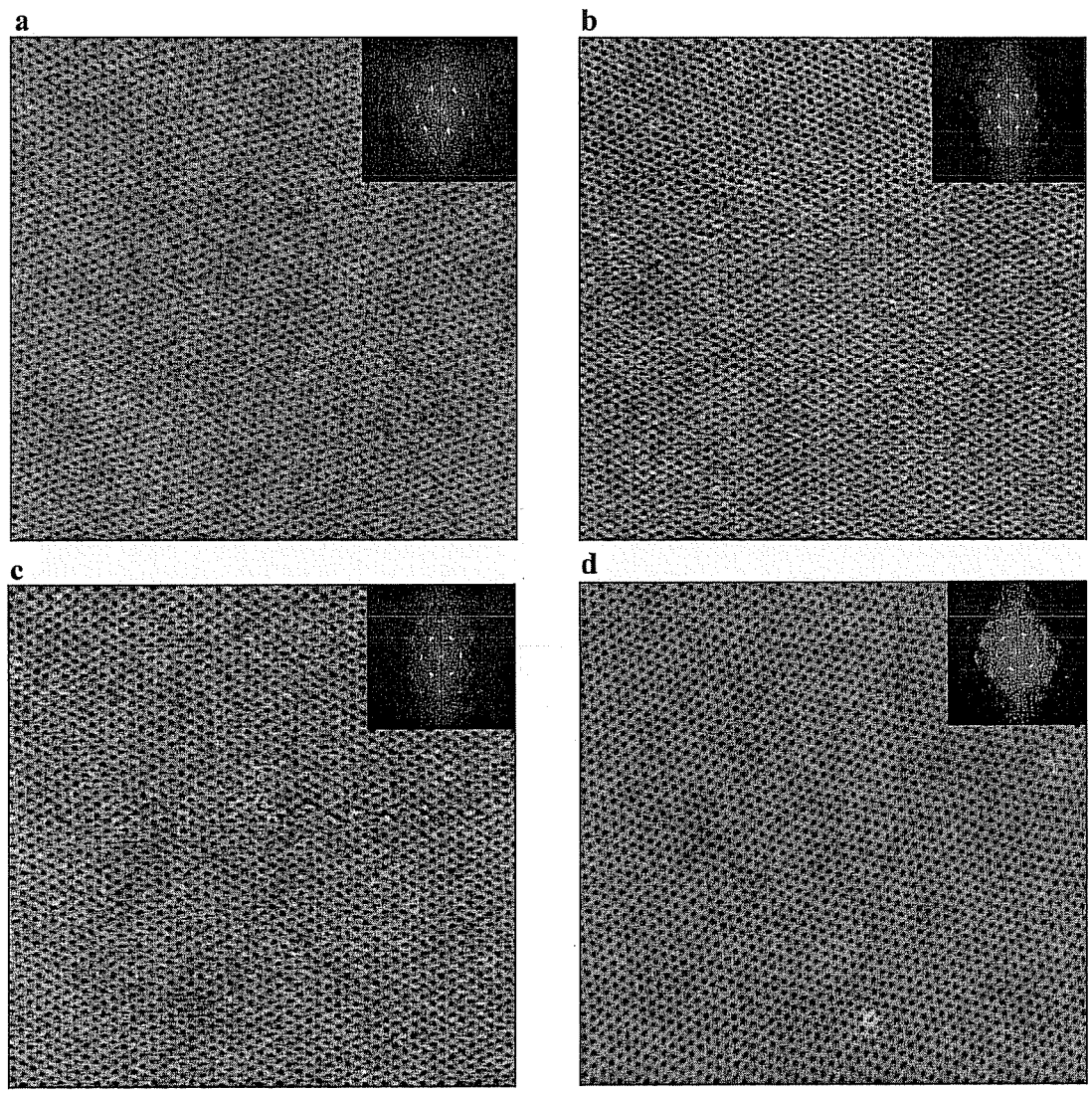
FIG. 3 consists of SFM images of 2 micrometer×2 micrometer areas of surface reconstructed PS-b-P4VP films on a variety of substrates: (a) polystyrene; (b) germanium; (c) polyimide; (d) poly(butylene terephthalate). The high degree of order is reflected in the Fourier transform as shown in the insets.

A high molecular weight PS-b-P4VP was purchased from Polymer Source having number average molecular weights of the PS and P4VP blocks of 47.6 kilograms/mole (kg/mol) and 20.9 kg/mol, respectively, and a polydispersity ($M_w/M_n$) of about 1.14. FIG. 2 shows scanning force microscopic (SFM) images of the (a) as-spun, (b) solvent-annealed, and (c) surface-reconstructed PS-b-P4VP films on a silicon substrate. The SFM image of the as-spun film (FIG. 2a) shows a surface covered with circular domains, having an average separation distance of 44.3±2.0 nm and an average diameter of 30.0±1.0 nm. These results suggest that the cylindrical microdomains of the P4VP are oriented normal to the surface. Independent transmission electron microscopy (TEM) measurements (not shown) of the as-spun film, stained with iodine, confirmed that the P4VP microdomains were, in fact, oriented normal to the film surface. Here, the PS-b-P4VP films were floated off the silicon substrate onto a buffered aqueous 5 weight percent hydrofluoric acid (HF) solution and colleted on a carbon-coated grid. When the as-spun films were exposed to toluene/THF mixtures under nitrogen at room temperature for 6 hours, a hexagonal array of the circular domains was obtained with significantly enhanced lateral order (FIG. 2b). Immersion of the PS-b-P4VP films in ethanol, a good solvent for P4VP and a non-solvent for PS, for 20 minutes led to a reconstruction of the film resulting a highly order array of nanoscopic pores. This result is similar to that found by Xu et al. when thin films of PS-b-PMMA were placed in acetic acid, a preferential solvent for PMMA. See T. Xu et al., "Block copolymer surface reconstruction: a reversible route to nanoporous films", *Advanced Functional Materials*, volume 13, pages 698-702 (2003). In our case, the P4VP block is solubilized by ethanol and, upon drying, the P4VP is left on top of the PS matrix (as confirmed by x-ray photoelectron spectroscopy), leaving pores at the positions of the cylindrical P4VP microdomains. TEM images of reconstructed films (not shown) confirmed the nanoporous structure of the film (as depicted in FIG. 1). The film thicknesses of as-spun and reconstructed PS-b-P4VP samples were found to be 24 nanometers and 27 nanometers, respectively, by x-ray reflectivity. The solvent annealed and reconstructed PS-b-P4VP films are characterized by a hexagonal array of cylindrical microdomains or nanopores with an average center-to-center distance of 43.5±0.3 nanometers. The Fourier transforms of the SFM images (shown in the insets of FIGS. 2b and 2c) were six-point patterns, with multiple higher-order reflections, which is characteristic of the long-range lateral order. Substantially identical results were obtained on numerous inorganic substrates, including gold and germanium, and on polymeric substrates like polystyrene, poly(4,4'-oxydiphenylene-pyromellitimide) (Kapton polyimide), and poly(butylene terephthalate). FIG. 3 shows SFM images of 2 micrometer×2 micrometer sections of surface reconstructed PS-b-P4VP films on a variety of substrates: (a) polystyrene, (b) germanium, (c) Kapton polyimide, and (d) poly(butylene terephthalate). Impressive degrees of order are reflected in the Fourier transforms shown in the respective insets.

A thin layer of gold was evaporated onto the surface of the reconstructed films by orienting the film surface at an angle of about 5° with respect to the path of the gold atoms from the target in the evaporator. This prevented the deposition of gold onto the walls of the pores. The thickness of gold layer was about 0.7 nanometers, as determined by x-ray reflectivity. The gold layer on the surface of the film was investigated using grazing incidence-small angle x-ray scattering (GI-SAXS). GI-SAXS measurements were performed on the X22B beamline (National Synchrotron Light Source, Brooldiaven National Laboratory) using x-rays with a wavelength, $\lambda$, of 1.525 Angstroms. These results confirmed the existence of an approximately 1 nanometer thick gold layer on the reconstructed films that had pores located at the positions of the original pores in the films. The results also confirmed that the gold remained on the surface without coating the pore walls. Upon heating, the nanoporous structure collapsed at about 115° C. without the gold coating, while with gold on the surface, the nanoporous structure was stable to about 200° C.

Figure 4:
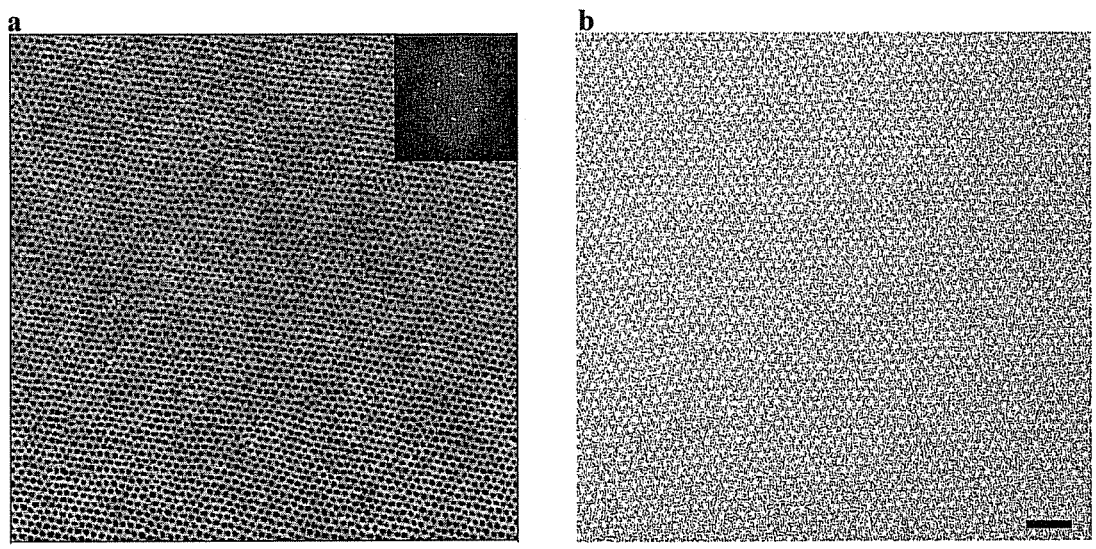
FIG. 4 consists of SFM and transmission electron microscopy (TEM) images of 2 micrometer×2 micrometer areas of highly ordered PS-b-P4VP films prepared from a lower molecular weight PS-b-P4VP: (a) SFM image of surface reconstructed film; (b) TEM image of gold films deposited after surface reconstruction (scale bar: 100 nanometers). The Fourier transform inset of image (a) shows a high degree of order comparable to that observed for films prepared with a higher molecular weight PS-b-P4VP.

Experiments were also performed use a PS-b-P4VP having PS and P4VP block molecular weights of 25,000 and 7,000 atomic mass units, respectively, and a polydispersity of 1.09 (purchased from Polymer Source). FIG. 4 shows SFM and TEM images of PS-b-P4VP after spin coating and solvent annealing with a toluene/THF mixture, followed by swelling with alcohol and drying, to produce a nanoporous template. The Fourier transform in the inset of FIG. 4a consists of a six-point pattern, with multiple higher-order reflections, which is characteristic of the long-range lateral order. Subsequently, an approximately 1 nanometer thick layer of gold was deposited onto the surface of the films at a glancing angle, which yielded the TEM image in the right side of FIG. 4b. Here, a hexagonal array of 15.0±0.3 nm diameter pores in the gold film is seen. A lower magnification SEM image (not shown) indicated that the lateral order persisted over an area of 3 micrometer×2 micrometer scale. In fact, a separate experiment showed that this order could be obtained over a 10 micrometer×10 micrometer area.

Figure 5:
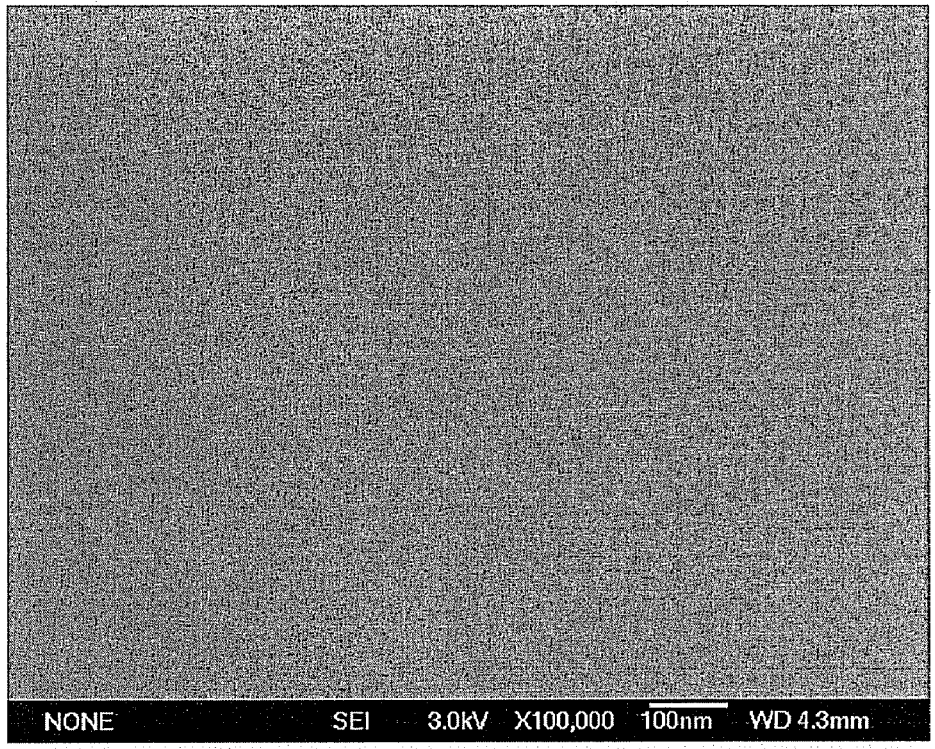
FIG. 5 consists of SEM images of highly ordered nanoporous templates fabricated on a silicon substrate via reactive ion etching (scale bar: 100 nm): (a) top view; (b) cross-sectional view.
Figure 5:
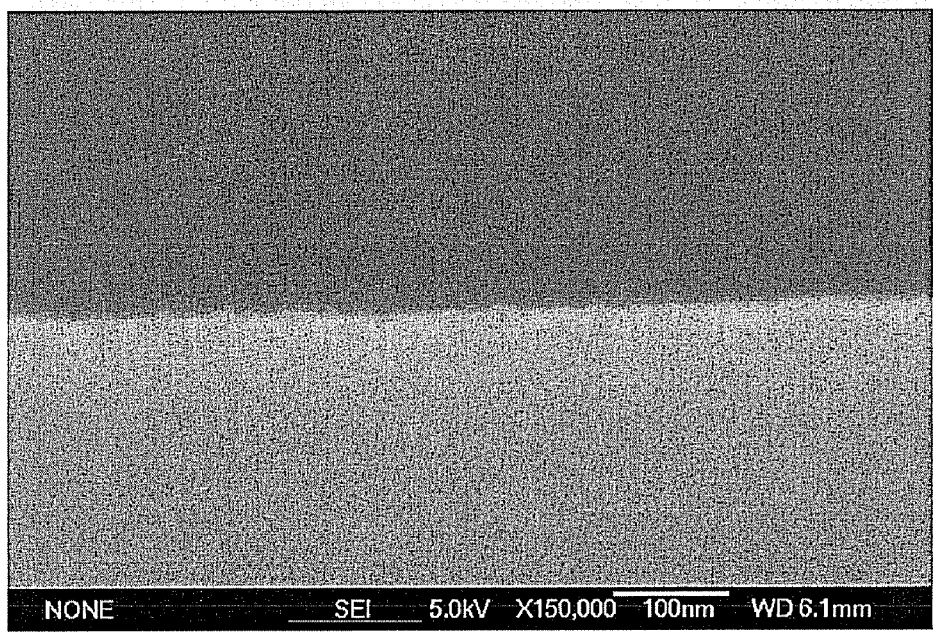

The gold-coated films were exposed to reactive ion etching using a tetrafluoromethane ($CF_4$) precursor at a flow rate of 10 standard cubic centimeters per minute and a power of 65 watts for 40 seconds. In control experiments, these etching conditions were observed to etch silicone oxide at a rate of about 1.1 nanometers per second. After etching, the gold-coated films were removed with a 10 weight percent potassium iodide/iodine ($KI/I_2$, 4:1 volume/volume) solution followed by heating to 400° C. for 3 hours. FIG. 5 shows SEM images of an array of holes that were etched into the underlying silicon oxide, which is identical to that seen in the original block copolymer template. The top view (a) shows a highly ordered nanoporous structure with an areal density of about $10^{15}$ holes/square/meter, while the cross-sectional view (b) shows the aspect ratios of the pores (depth:diameter) to be about 3:1. As an alternative to removing the gold-coated films with aqueous $KI/I_2$, lift-off procedures using a toluene/THF mixture could also be used.

In conclusion, we have shown that using a combination of solvent casting, annealing, and surface reconstruction, highly oriented and ordered arrays of cylindrical microdomains could be achieved in thin films. Arrays of nanopores in the thin films could easily be achieved with pore diameters down to at least 15 nanometers. By a glancing angle evaporation of a metal onto the surface of the reconstructed film, an etching mask with very high etching contrast could be obtained that allowed pattern transfer to the underlying substrate with exceptional fidelity. All of the processes described were nondisruptive and, as such, can easily be transferred to current microlithographic fabrication processes.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a nanopatterned substrate, comprising:
    forming a block copolymer film on a substrate;
    annealing the block copolymer film in an annealing solvent vapor at a temperature of about 10 to about 60° C. for at least 10 minutes;
    surface reconstructing the annealed block copolymer film;
    coating an etch-resistant layer on the surface reconstructed block copolymer film to form a resist-coated block copolymer film;
    etching the resist-coated block copolymer film to create an etched article comprising a nanopatterned substrate; and
    separating the etch-resistant layer and the block copolymer film from the nanopatterned substrate.

2. The method of claim 1, wherein the substrate comprises a material selected from the group consisting of silicon dioxide, silicon nitride, passivated silicon, polystyrenes, polyimides, and poly(butylenes terephthalate)s, and germanium.

3. The method of claim 1, wherein the block copolymer comprises at least one block selected from the group consisting of polyolefins, poly(alkenyl aromatic)s, poly(conjugated dienes)s, hydrogenated poly(conjugated dienes)s, poly(vinyl-substituted nitrogen heterocycle)s, poly(alkyl (meth)acrylate)s, poly((meth)acrylic acid)s, poly(alkylene oxide)s, poly(arylene oxide)s, poly(arylene sulfide)s, poly(vinyl alkanoates), poly(vinyl ether)s, poly(vinyl halide)s, poly(vinyl alcohol)s, polyurethanes, poly(meth)acrylonitriles, polyesters, polyamides, polyimides, polycarbonates, polysulfones, and polysiloxanes.

4. The method of claim 1, wherein the block copolymer comprises a poly(alkenyl aromatic) block that is the polymerization product of an alkenyl aromatic monomer having the structure

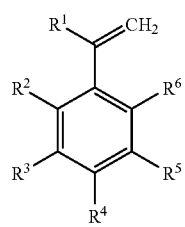

wherein $R^1$ is hydrogen or $C_1$-$C_6$ alkyl, and each occurrence of $R^2$, $R^3$, $R^4$, $R^5$, and $R^6$ is independently selected from the group consisting of hydrogen, $C_1$-$C_6$ alkyl, and halogen.

5. The method of claim 1, wherein the block copolymer comprises a polystyrene block.

6. The method of claim 1, wherein the block copolymer comprises a poly(vinyl-substituted nitrogen heterocycle) block that is the polymerization product of a vinyl-substituted nitrogen heterocycle selected from the group consisting of 2-vinylpyridine, 3-vinylpyridine, 4-vinylpyridine, 2-methyl-5-vinylpyridine 1-vinylimidazole, 2-vinylimidazole, 4-vinylimidazole, N-vinyl-2-methylimidazole, N-vinyl-2-ethylimidazole, 2-vinylpyrrole, 3-vinylpyrrole, and mixtures thereof.

7. The method of claim 1, wherein the block copolymer comprises a poly(4-vinylpyridine) block.

8. The method of claim 1, wherein the block copolymer is a polystyrene-poly(4-vinylpyridine) diblock copolymer.

9. The method of claim 1, wherein the block copolymer comprises a first block and a second block in a volume ratio of about 1:10 to about 10:1.

10. The method of claim 1, wherein coating the block copolymer film comprises spin coating the block copolymer film from a solution comprising a polystyrene-poly(4-vinylpyridine) diblock copolymer, toluene, and tetrahydrofuran.

11. The method of claim 1, wherein the block copolymer film has a thickness of about 10 to about 100 nanometers.

12. The method of claim 1, wherein the block copolymer film has a thickness corresponding to about one period of the block copolymer.

13. The method of claim 1, wherein the block copolymer is a polystyrene-poly(4-vinylpyridine) diblock copolymer, and wherein the annealing solvent vapor comprises toluene and tetrahydrofuran.

14. The method of claim 1, wherein the annealed block copolymer film comprises a hexagonal array of cylindrical microdomains.

15. The method of claim 14, wherein the hexagonal array of cylindrical microdomains is characterized by an orientation order of at least 0.9.

16. The method of claim 14, wherein the cylindrical microdomains are separated by a nearest-neighbor distance of about 10 to about 100 nanometers.

17. The method of claim 1, wherein the annealed block copolymer film comprises a linear array of microdomains.

18. The method of claim 1, wherein the block copolymer is a polystyrene-poly(4-vinylpyridine) diblock copolymer, and wherein the surface reconstructing the annealed block copolymer film comprises immersing the block copolymer film in a lower alkanol solvent selected from the group consisting of methanol, ethanol, and mixtures thereof.

19. The method of claim 1, wherein the coating the etch-resistant layer on the surface reconstructed block copolymer film comprises using a method selected from the group consisting of evaporating, sputtering, chemical vapor deposition, and metalorganic chemical vapor deposition.

20. The method of claim 1, wherein the etch-resistant layer comprises an etch-resistant material selected from the group consisting of iron, ruthenium, osmium, cobalt, nickel, palladium, platinum, copper, silver, and gold.

21. The method of claim 1, wherein the coating the etch-resistant layer on the surface reconstructed block copolymer film comprises depositing gold onto the surface reconstructed block copolymer film.

22. The method of claim 1, wherein the etching the resist-coated block copolymer film comprises reactive ion etching using a tetrafluoromethane precursor.

23. The method of claim 1, wherein the separating the etch-resistant layer and the block copolymer film from the nanopatterned substrate comprises contacting the etched article with an aqueous solution comprising potassium iodide and iodine.

24. The method of claim 1, wherein the nanopatterned substrate is a nanoporous substrate comprising cylindrical pores having a ratio of pore depth to pore diameter of about 1:1 to about 100:1.

25. The method of claim 1, wherein said surface reconstructing the annealed block copolymer film comprises exposing the annealed block copolymer film to a solvent that preferentially dissolves the minor phase of the block copolymer film and effects transfer of the minor phase to the surface of the film.

26. A method of preparing a nanoporous substrate, comprising:
spin coating a block copolymer film on a substrate; wherein the block copolymer film comprises a polystyrene-poly(4-vinylpyridine) diblock copolymer comprising a polystyrene block having a number average molecular weight of about 20,000 to about 60,000 atomic mass units and a poly(4-vinylpyridine) block having a number average molecular weight of about 5,000 to about 30,000 atomic mass units; wherein the polystyrene-poly(4-vinylpyridine) diblock copolymer has a polydispersity index of about 1.05 to about 1.2; and wherein the block copolymer film has a thickness of about 15 to about 30 nanometers;
annealing the block copolymer film in an annealing solvent vapor comprising toluene and tetrahydrofuran; wherein the annealed block copolymer film comprises a hexagonal array of cylindrical poly(vinyl-substituted nitrogen heterocycle) microdomains;
surface reconstructing the annealed block copolymer film by immersing it in ethanol, thereby forming a surface reconstructed block copolymer film comprising a hexagonal array of cylindrical pores;
coating a gold layer on the surface reconstructed block copolymer film; wherein the gold layer has a thickness of about 0.5 to about 2 nanometers;
etching the gold-coated block copolymer film to create an etched structure comprising a substrate comprising a hexagonal array of pores; wherein etching comprises reactive ion etching using a gas comprising tetrafluoromethane; and
treating the etched structure with a solution comprising iodine and potassium iodide to separate the gold layer and the block copolymer film from the substrate, thereby yielding a nanoporous substrate.

* * * * *